US010781830B2

(12) United States Patent
Mannebach et al.

(10) Patent No.: US 10,781,830 B2
(45) Date of Patent: Sep. 22, 2020

(54) HYDROPNEUMATIC PISTON ACCUMULATOR

(71) Applicant: HYDAC TECHNOLOGY GMBH, Sulzbach/Saar (DE)

(72) Inventors: Horst Mannebach, Saarbruecken (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 44 days.

(21) Appl. No.: 16/310,489

(22) PCT Filed: Apr. 11, 2017

(86) PCT No.: PCT/EP2017/000469
§ 371 (c)(1),
(2) Date: Dec. 17, 2018

(87) PCT Pub. No.: WO2017/220179
PCT Pub. Date: Dec. 28, 2017

(65) Prior Publication Data

US 2019/0120257 A1 Apr. 25, 2019

(30) Foreign Application Priority Data

Jun. 25, 2016 (DE) ........................ 10 2016 007 824

(51) Int. Cl.
*F16L 55/04* (2006.01)
*F15B 1/24* (2006.01)

(52) U.S. Cl.
CPC ............ *F15B 1/24* (2013.01); *F15B 2201/31* (2013.01); *F15B 2201/515* (2013.01)

(58) Field of Classification Search
CPC ............................. F15B 1/24; F15B 2201/515
(Continued)

(56) References Cited

U.S. PATENT DOCUMENTS 2,729,244 A * 1/1956 Alaska ...................... F15B 1/24 138/31
3,043,340 A * 7/1962 Rehbock .................. F15B 1/24 138/31
(Continued)

FOREIGN PATENT DOCUMENTS

DE 71 03 342 1/1971
DE 103 10 427 9/2004
(Continued)

OTHER PUBLICATIONS

International Search Report dated Jul. 26, 2017 in International (PCT) Application Np. PCT/EP2017/000469.

*Primary Examiner* — James F Hook
(74) *Attorney, Agent, or Firm* — Wenderoth, Lind & Ponack, L.L.P.

(57) ABSTRACT

A hydropneumatic piston accumulator has an accumulator housing (1) with a cylindrical tube (3) defining a longitudinal axis (11). The cylindrical tube (3) is closed at both ends by housing covers (5, 7). A piston (9) is longitudinally movable in the cylindrical tube (3) and separates a working chamber (13) for a compressible medium from a working chamber for an incompressible medium. A displacement measuring device determines the position of the piston (9) in the housing in a contact-free manner. The displacement measuring device includes a non-magnetic measuring tube (29) extending along the longitudinal axis (11) from one housing cover (5) to the other housing cover (7) and through a passage (31) formed in the piston (9) and is sealed against the interior of the housing (1). In the tube (29), a position sensor (57) is movably guided and follows the piston movements in the measuring tube (29) using a magnetic force acting between the piston sensor (57) and the piston (9). A transmitter/receiver (65) for the displacement measuring device is positioned on one of the housing covers (5,
(Continued)

7) and emits a measurement beam through the open end (25, 26) of the measuring tube (29) to the position sensor (57) and receives reflected radiation.

19 Claims, 2 Drawing Sheets

(58) Field of Classification Search
USPC ........................................................ 138/30, 31
See application file for complete search history.

(56) References Cited

U.S. PATENT DOCUMENTS

| | | | | | |
|---|---|---|---|---|---|
| 3,654,956 | A * | 4/1972 | Tsubouchi | B60T 11/26 | 340/450.1 |
| 3,929,163 | A * | 12/1975 | Schon | F15B 1/08 | 138/30 |
| 4,799,048 | A * | 1/1989 | Goshima | F15B 1/04 | 138/31 |
| 4,876,945 | A * | 10/1989 | Stoll | F15B 15/1457 | 92/5 R |
| 5,024,250 | A * | 6/1991 | Nakamura | F15B 1/08 | 138/104 |
| 5,367,944 | A * | 11/1994 | Akeel | B05B 5/1625 | 91/1 |
| 5,520,053 | A * | 5/1996 | Weber | F15B 1/08 | 138/31 |
| 10,066,645 | B2 | 9/2018 | Schlemmer et al. | | |
| 2014/0290972 | A1* | 10/2014 | Robson | B25D 9/145 | 173/1 |
| 2015/0275931 | A1 | 10/2015 | Schlemmer et al. | | |
| 2015/0285272 | A1* | 10/2015 | Kosterev | F16K 31/08 | 138/31 |
| 2016/0123356 | A1 | 5/2016 | Jirgal et al. | | |

FOREIGN PATENT DOCUMENTS

| | | |
|---|---|---|
| DE | 10 2004 057 769 | 6/2006 |
| DE | 10 2012 022 871 | 5/2014 |
| DE | 10 2013 009 614 | 12/2014 |
| DE | 10 2014 105 154 | 10/2015 |
| JP | 62-97307 | 6/1987 |
| JP | 7-269503 | 10/1995 |

* cited by examiner

HYDROPNEUMATIC PISTON ACCUMULATOR

FIELD OF THE INVENTION

The invention relates to a hydropneumatic piston accumulator, comprising a storage housing having a cylinder tube defining a longitudinal axis. The cylinder tube is closed at each end by a housing cover. A piston can be moved longitudinally in the cylinder tube and separates a working chamber for a compressible medium, such as a working gas, from a working chamber for an incompressible medium, such as hydraulic oil, in the housing. A displacement-measuring device determines the position of the piston in the housing in a non-contacting manner.

BACKGROUND OF THE INVENTION

Hydraulic accumulators, such as hydropneumatic piston accumulators, are used in hydraulic systems to receive and return certain volumes of pressurized fluid, such as hydraulic oil, to the system as needed. In today's conventional hydropneumatic piston accumulators, in which the piston separates the oil-side working chamber from the working chamber receiving a working gas such as $N_2$, the position of the piston changes such that the accumulator absorbs hydraulic oil as the pressure increases, thereby compressing the gas in the other working chamber. With decreasing pressure, the compressed gas expands, displacing stored hydraulic oil back into the hydraulic circuit. The resulting changes in the volumes of the work chambers in operation causes a corresponding axial movement of the piston in every case.

A prerequisite for the desired flawless performance of the storage is the adaptation of the pressure in the working chamber of the working gas to the pressure level in the oil-side working chamber. The piston is then positioned at appropriate locations within the storage housing to perform the working movements between piston end positions in the storage housing. The determination of the position the piston occupies at a given fluid pressure in the oil-side working chamber also provides information on the amount of the filling pressure of the working gas in the assigned working chamber, and thus, the monitoring of the piston accumulator for proper functioning.

Various solutions to determine the position of the piston have been proposed. DE 10 2013 009 614 A1, for example, discloses an ultrasonic displacement measuring system. Starting from the housing cover adjacent to the working chamber containing the working gas, an ultrasonic sensor is used to determine the distance to the facing side of the piston. This solution is rather elaborate because a continuous error correction of the result obtained by a running time measurement has to be performed due to the changing sound propagation velocity in the working chamber containing the gas. In a further known solution, disclosed in DE 103 10 427 A1, a row of magnetic field sensors is arranged on the outside of the storage housing. The sensors respond to the field of a magnet arrangement, which is located on the piston of the piston accumulator. This solution leaves much to be desired in that a magnetic strip containing the magnetic sensors has to be attached to the storage housing as an exterior component.

SUMMARY OF THE INVENTION

Based on this prior art, the invention addresses the problem of providing an improved hydropneumatic piston accumulator of the type mentioned, where the displacement-measuring device permits the determination of the position of the piston in a particularly simple and advantageous manner.

According to the invention, this object is basically achieved by a piston accumulator where, the displacement-measuring device according to the invention has a non-magnetic measuring tube. The measuring tube extends through a passage formed in the piston along the longitudinal axis from one housing cover to the other housing cover and is sealed against the interior of the housing. A position sensor used for measuring is displaceably guided in the measuring tube and follows the movements of the piston upon the action of a magnetic force acting between piston and position sensor in the measuring tube. A transmitter/receiver of the displacement-measuring device located on a housing cover sends a measuring radiation to the position sensor through the relevant open end of the measuring tube and receives the reflected radiation therefrom. Because the interior of the measuring tube forms a measuring zone independent of the physical state of the interior of the housing, a chamber with constant media pressure and constant media density is available for the passage of the measuring radiation, such as ultrasound. Thus, at a constant speed of sound, a distance measurement by a displacement-measuring device having an ultrasonic transmitter/receiver can be performed easily and accurately without measures for error correction being required. The measuring tube can also be used to conduct a laser measurement.

To generate the magnetic force forcing the subsequent movements of the position sensor in the measuring tube, a permanent-magnet device may advantageously be provided on the piston. That device entrains the position sensor during the travel of the piston, which position sensor is formed of a ferromagnetic material or is provided with ferromagnetic components.

For the generation of a particularly high force of attraction acting on the position sensor, a permanent-magnet device can also be provided on the position sensor, for example, a magnetically hard ferrite core located in the position transmitter.

In a particularly advantageous manner, the permanent-magnet device on the piston can have a magnetic ring being mounted to the passage of the piston and surrounding the measuring tube.

In particularly advantageous embodiments, in which the position sensor has two circular disks extending on a plane radial to the longitudinal axis, those disks are interconnected by a coaxial, radially inwardly offset connecting part. The axial spacing of the flat end surfaces of the disks preferably corresponds to the axial height of the magnetic ring on the piston. In the case of an axial polarity of the magnetic ring, a high magnetic flux density and a high magnetic force effect, forcing the safe subsequent movement of the position sensor, result at the disks of the position sensor.

Advantageously a ferrite core, which is polarized in the axial direction reversed to the magnet ring, can be provided in the connecting part of the disks, as a permanent-magnet device on the position sensor.

For a magnetic decoupling of the magnetic ring relative to the piston material, in advantageous exemplary embodiments, the magnetic ring is connected to the piston via an intermediate body made of non-magnetic material. It may be formed from a thermosetting plastic and mounted onto the piston by screws, which are preferably also non-magnetic.

Advantageously, one end of the measuring tube is firmly connected to a housing cover, for example, by a soldered or welded connection. The other end engages with a passage located on the other housing cover, leading towards the outside. The open end of the tube is sealed against the interior of the housing. A seat is formed for the displacement-measuring device.

In doing so, the seat in the housing cover in question can receive the transmitter/receiver for sending and receiving an optical or preferably ultrasound-acoustic measuring radiation passing through the open end of the measuring tube.

The seat for the displacement-measuring device may be provided on the housing cover adjacent to the oil-side working chamber. Advantageously, in this way the port connections of the displacement-measuring device and the pipe leading to the assigned hydraulic system, which is connected to a port opening located in this housing cover, are located on one and the same side of the storage housing.

On the housing cover, opposite the housing cover having the seat of the displacement-measuring device, the measuring tube may be connected to the environment. The pressure-resistant measuring tube is thus pressureless, i.e. no particularly elaborate sealing is required at the passage, which forms the seat for the displacement-measuring device. For an unpressurized measuring tube, the displacement-measuring device can also be removed from the piston accumulator after the measuring periods have been completed without interrupting the piston accumulator's operation.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
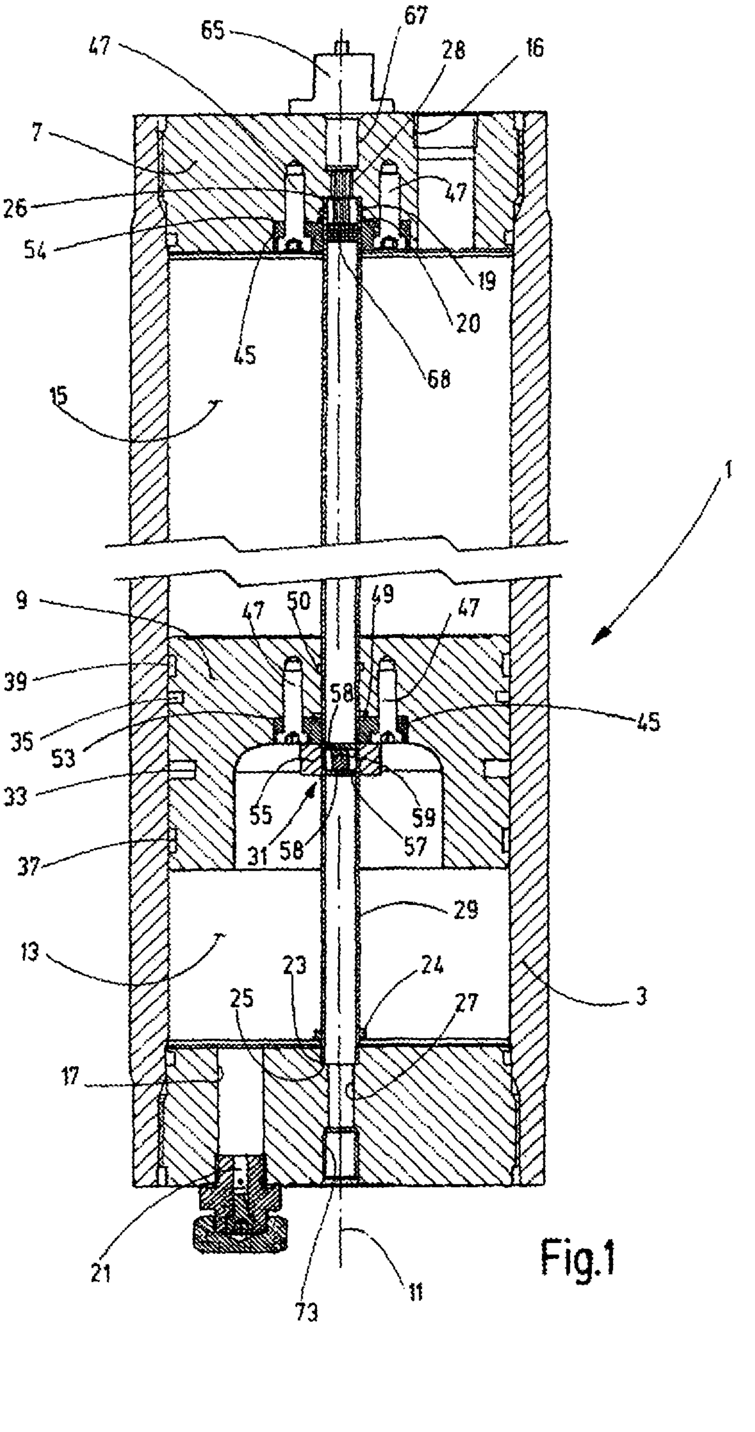
FIG. 1 is a shortened, side view in section of a piston accumulator according to an exemplary embodiment of the invention.

The piston accumulator according to the invention has a storage housing 1. The housing has a cylinder tube 3 forming a round hollow cylinder shown as the main part in both exemplary embodiments. It is sealed at both ends by a screwed housing cover 5 and 7, respectively, between which a piston 9 is freely movable along the longitudinal axis 11 of the housing. The piston 9 separates a gas-side working chamber 13 that receives a working gas such as nitrogen. The gas is pressurized with a filling pressure, as a compressible medium, from a working chamber 15, which receives an incompressible medium, such as hydraulic oil. For the connection of this working chamber 15 to an assigned hydraulic system (not shown), a port opening 16 is provided in the housing cover 7 adjacent to the oil-side working chamber. Port 16 is arranged in the area between the longitudinal axis 11 and the radially outer end of the housing cover 7. On the opposite housing cover 5, which is adjacent to the gas-side working chamber 13, also offset from the longitudinal axis 11, a filling channel 17 is provided at the outer end. A filling valve 21 of the usual type is arranged in filling channel 17 and can be used to introduce the fill quantity of working gas pressurized at filling pressure into the working chamber 13. In coaxial arrangement to the longitudinal axis 11, a passage opening 27 is formed in this housing cover 5 adjacent to the gas-side working chamber 13. Passage opening 27 has the form of a stepped drilled hole with an inner, enlarged section of the drilled hole 23, which forms a suitable seat for the inserted, open end 25 of a measuring tube 29. The open end 25 of the measuring tube 29 is sealed against the adjacent working chamber 13. The opposite end 26 of the measuring tube 29 engages with a coaxial through-hole 28 in the housing cover 7 adjacent to the oil-side working chamber 15. Similar to the through hole 27, the drilled hole 28 is stepped at the other housing cover 5. The end 26 of the measuring tube 29 is mounted in a section of a drilled hole, where the sealing elements 19 and 20 seal the pipe end 26 against the working chamber 15. The end 25, which is seated in the drilled-hole section 23 of the housing cover 5 adjacent to the gas-side working chamber 13 of the measuring tube 29. Measuring tube 29 is formed of a pressure-resistant, non-magnetic metallic material and is attached to the housing cover 5 by a soldering or welding connection 24. The measuring tube 29 may extend into the interior of the storage housing over its entire length. In particular at the lower end of the measuring tube 29, can also end in a pressure-tight manner, while maintaining an axial distance from the housing cover 5.

A central passage 31 is formed for the measuring tube 29 in the piston 9. Otherwise, the piston 9 is formed in the usual manner for such accumulator pistons and has recessed annular grooves 33 and 35 on its outer circumference for piston seals (not shown). Axially offset from these grooves 33 and 35 towards the two axial end areas, flatter or wider annular grooves 37 and 39 are provided for guide rails (not shown). As is also customary in such pistons, the piston 9 has a round cup-shaped recess 41. The flat bottom 43 of recess 41 is located at approximately half the axial length of the piston 9. Recess 41 is on the piston side that faces the gas-side working chamber 13 in the storage housing 1. The bushing 31 has a through or drilled hole 51, which extends coaxially to the longitudinal axis 11, starting from the bottom 43 to the piston end side. In the area of the drilled hole adjoining the bottom 43, the drilled hole has a circular cylindrical extension 53, which forms the seat for an annular body 45. Annular body 45 is mounted in the extension 53 by screws 47 extending parallel to the drilled hole 51. Ring grooves 49 and 50 are formed in the non-expanded part of the drilled hole 51 for sealing rings.

The annular body 45 mounted in the extension 53 forms the support for a permanent-magnet device, which generates a magnetic force. The attraction force of the permanent magnet device acts on a position sensor 57 displaceable in the measuring tube 29 and forces the position sensor 57 to follow the movement of the piston 9 in the measuring tube 29. In the exemplary embodiments shown, the permanent-magnet device of the piston 9 is formed by a magnetic ring 55, which is mounted by gluing to a free surface of the annular body 45 flush with the bottom 43. The screws 47 and the annular body 45 are made of thermosetting plastic to magnetically decouple the magnetic ring 55 from the metallic piston 9.

In the embodiment of FIG. 1, the position sensor 57 is formed as an integral round body of a ferromagnetic material, which has a flat circular disk 58 at both axially opposite ends. On the outer diameter of disks 58, the position sensor 57 is displaceably guided in the measuring tube 29. The disks 58 are integrally connected to one another via a reduced-diameter connecting part 59. The axial distance of the disks 58 is adapted to the axial height of the magnetic ring 55 such that the end surfaces of the disks 58 are aligned with the axial end surfaces of the magnetic ring 55. An optimal magnetic flux is then formed with the magnetic ring 55. The end face of the disk 58 of the position sensor 57, which faces the end 26 of the measuring tube 29, forms the reflection surface for the measuring radiation entering the measuring tube 29 from the end 26.

The stepped drilled hole 28 of the housing cover 7 receiving the end 26 of the measuring tube 29 has on the passage 31 of the piston 9, similar to the drilled hole 51, a circular cylindrical extension 54. A second annular body 45, as is also used on the passage 31 of the piston 9 as a plastic body, is mounted and secured using screws 47 in cylinder expansion 54. The annular body 45 forms a suitable apron of the inserted end section of the measuring tube 29 on the housing cover 7. The displacement-measuring device has a transmitter/receiver 65 for an ultrasonic measuring process, for which the outer, extended section of the drilled hole 67 of the drilled hole 28 forms a seat in the oil-side housing cover 7. Starting from this section of the drilled hole 67, an ultrasonic transducer with a disk-shaped piezoceramic 68 extends into the end area of the tube 29 to perform the determination of the distance from the reflection surface on the facing disk 58 of the position sensor 57.

Figure 2:
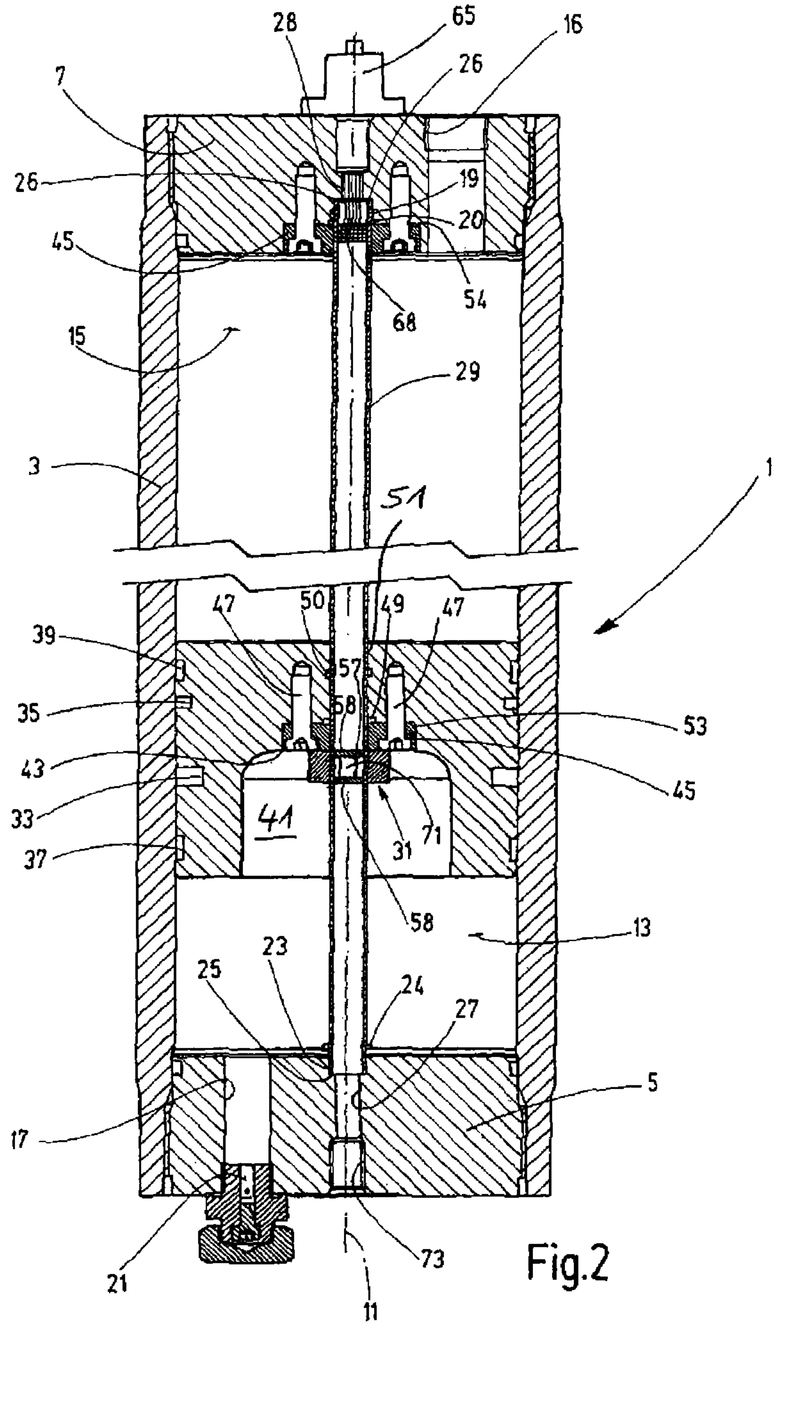
FIG. 2 is a shortened, side view in section of a piston accumulator according to a second exemplary embodiment of the invention.

The exemplary embodiment of FIG. 2 differs from FIG. 1 only insofar as a hard magnetic ferrite rod 71, instead of the connecting part 59 integral with the disks 58 of the position sensor 57, is inserted as a connecting part between the disks 58. This ferrite rod 71 is oriented such that its polarity is opposite the axial polarity of the magnetic ring 55. A strong magnetic force effect then results. A particularly safe tracking of the position sensor 57 is then ensured in the travel movements of the piston 9.

Instead of the ultrasonic measuring method, different types of measuring radiation can be used, for example using laser light or monochromatic visible light by optical methods. In the case of a measuring zone enclosed in the measuring tube 29, isolated from the interior of the housing, the measuring operation can be performed from an arbitrarily selected end 25 or 26 of the measuring tube 29. In contrast to the figures, the transmitter/receiver 65 can also be arranged on the gas-side housing cover 5. The extended, end-side drilled hole section 73 of the through hole 27 could form the seat for the displacement-measuring device.

While various embodiments have been chosen to illustrate the invention, it will be understood by those skilled in the art that various changes and modifications can be made therein without departing from the scope of the invention as defined in the claims.

The invention claimed is:

1. A hydropneumatic piston accumulator, comprising:

a storage housing including a cylinder tube defining a longitudinal axis and having first and second axial ends;

first and second covers being coupled to and closing said first and second housing axial ends, respectively, of said cylinder tube;

a piston being longitudinally movable in said cylinder tube and separating a first working chamber for compressible gas from a second working chamber for an incompressible fluid in said storage housing, said piston having a magnetic ring with an axial height;

a displacement measurer determining positions of said piston in said storage housing without contacting said piston, said displacement measurer including a non-magnetic measuring tube extending in said storage housing along said longitudinal axis from said first cover to said second cover and extending through a passage in said piston, said measuring tube having a tube interior sealed from said first and second working chambers;

a position sensor displaceably guided in said measuring tube and following movement of said piston in said storage housing due to a magnet force acting between said position sensor and said magnetic ring of said piston, said position sensor including first and second circular disks extending in planes radial to said longitudinal axis, said first and second circular disks being interconnected by a connecting part extending coaxially and being spaced radially inwardly relative to said first and second circular disks and said measuring tube, an axial distance between flat outside end surfaces of said first and second circular disks being equal to said axial height of said magnet ring on said piston; and a transmitter/receiver being arranged in one of said first and second covers, transmitting measuring radiation through an open end of said measuring tube to said position sensor and receiving radiation reflected to said transmitter/receiver by said position sensor.

2. A hydropneumatic piston accumulator according to claim 1 wherein said magnetic ring is a first permanent magnet generating the magnetic force.

3. A hydropneumatic piston accumulator according to claim 2 wherein a second permanent magnet is on said position sensor.

4. A hydropneumatic piston accumulator according to claim 2 wherein said magnetic ring surrounds said measuring tube and is mounted at said passage in said piston.

5. A hydropneumatic piston accumulator according to claim 1 wherein said magnetic ring is connected to said piston via an intermediate body of non-magnetic material.

6. A hydropneumatic piston accumulator according to claim 1 wherein said measuring tube has first and second axial tube ends, said first axial tube end is firmly connected to said first cover, said second axial tube end engaging an outward passage in said second cover and having said open end of said measuring tube sealed against said first and second working chambers, said second cover having a seal receiving said transmitter/receiver.

7. A hydropneumatic piston accumulator according to claim 1 wherein said transmitter/receiver sends and receives optical measuring radiation through said open end of said measuring tube.

8. A hydropneumatic piston accumulator according to claim 1 wherein said transmitter/receiver sends and receives acoustic measuring radiation through said open end of said measuring tube.

9. A hydropneumatic piston accumulator according to claim 1 wherein said transmitter/receiver is in a seat on said second cover adjacent said second wording chamber for an incompressible fluid.

10. A hydropneumatic piston accumulator according to claim 1 wherein said measuring tube having an axial tube end, opposite to said open end connected to said transmitter/receiver, connected in fluid communication with an environment outside said storage housing at ambient pressure.

11. A hydropneumatic piston accumulator, comprising:

a storage housing including a cylinder tube defining a longitudinal axis and having first and second axial ends;

first and second covers being coupled to and closing said first and second housing axial ends, respectively, of said cylinder tube;

a piston being longitudinally movable in said cylinder tube and separating a first working chamber for compressible gas from a second working chamber for an incompressible fluid in said storage housing;

a displacement measurer determining positions of said piston in said storage housing without contacting said piston, said displacement measurer including a non-magnetic measuring tube extending in said storage housing along said longitudinal axis from said first cover to said second cover and extending through a passage in said piston, said measuring tube having a tube interior sealed from said first and second working chambers;

a position sensor displaceably guided in said measuring tube and following movement of said piston in said storage housing due to a magnet force acting between said position sensor and said piston;

a transmitter/receiver being arranged in one of said first and second covers, transmitting measuring radiation through a first open end of said measuring tube to said position sensor and receiving radiation reflected to said transmitter/receiver by said position sensor; and a second open end of said measuring tube, opposite to said first open end of said measuring tube, being in fluid communication with an environment outside of said storage housing at ambient pressure.

12. A hydropneumatic piston accumulator according to claim 11 wherein said piston has a magnetic ring of a first permanent magnet generating the magnetic force.

13. A hydropneumatic piston accumulator according to claim 12 wherein a second permanent magnet is on said position sensor.

14. A hydropneumatic piston accumulator according to claim 12 wherein said magnetic ring surrounds said measuring tube and is mounted at said passage in said piston.

15. A hydropneumatic piston accumulator according to claim 12 wherein said magnetic ring is connected to said piston via an intermediate body of non-magnetic material.

16. A hydropneumatic piston accumulator according to claim 11 wherein said measuring tube has first and second axial tube ends, said first axial tube end is firmly connected to said first cover, said second axial tube end engaging an outward passage in said second cover and having said first open end of said measuring tube sealed against said first and second working chambers, said second cover having a seal receiving said transmitter/receiver.

17. A hydropneumatic piston accumulator according to claim 11 wherein said transmitter/receiver sends and receives optical measuring radiation through said open end of said measuring tube.

18. A hydropneumatic piston accumulator according to claim 11 wherein said transmitter/receiver sends and receives acoustic measuring radiation through said open end of said measuring tube.

19. A hydropneumatic piston accumulator according to claim 11 wherein said transmitter/receiver is in a seat on said second cover adjacent said second wording chamber for an incompressible fluid.

* * * * *